(12) United States Patent
Yan et al.

(10) Patent No.: US 10,778,884 B2
(45) Date of Patent: Sep. 15, 2020

(54) AUTOMATED ADJUSTMENT OF IMAGE STABILIZATION MODE

(71) Applicant: Snap Inc., Santa Monica, CA (US)

(72) Inventors: Rong Yan, Marina Del Ray, CA (US); Liu Liu, Marina Del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/505,670

(22) Filed: Jul. 8, 2019

(65) Prior Publication Data

US 2019/0335095 A1    Oct. 31, 2019

Related U.S. Application Data

(63) Continuation of application No. 16/293,213, filed on Mar. 5, 2019, now Pat. No. 10,382,669, which is a
(Continued)

(51) Int. Cl.
*H04N 5/232* (2006.01)
*H04N 5/77* (2006.01)
*G02B 27/01* (2006.01)
*G02C 11/00* (2006.01)
*H04N 5/225* (2006.01)

(52) U.S. Cl.
CPC ..... *H04N 5/23216* (2013.01); *G02B 27/0172* (2013.01); *G02C 11/10* (2013.01); *H04N 5/232* (2013.01); *H04N 5/23245* (2013.01); *H04N 5/23248* (2013.01); *H04N 5/23254* (2013.01); *H04N 5/23264* (2013.01); *H04N 5/23293* (2013.01); *H04N 5/772* (2013.01); *G02B 2027/0138* (2013.01); *G02B 2027/0178* (2013.01); *H04N 5/2251* (2013.01)

(58) Field of Classification Search
CPC .................................................. H04N 5/23216
USPC ........................................................ 348/207.1
See application file for complete search history.

(56) References Cited

U.S. PATENT DOCUMENTS 6,038,295 A    3/2000    Mattes
6,980,909 B2   12/2005   Root et al.
(Continued)

FOREIGN PATENT DOCUMENTS

| CA | 2887596 A1 | 7/2015 |
| EP | 2897355 A1 | 7/2015 |
| WO | WO-2017040633 A1 | 3/2017 |

OTHER PUBLICATIONS

"U.S. Appl. No. 14/841,097, Final Office Action dated Feb. 6, 2018", 11 pgs.
(Continued)

*Primary Examiner* — Joel W Fosselman
(74) *Attorney, Agent, or Firm* — Schwegman Lundberg & Woessner, P.A.

(57) ABSTRACT

A portable electronic device with image capturing capabilities automatically or semi-automatically adjusts one or more image capturing parameters based on an input attribute of user engagement with a single-action haptic input mechanism. For example, the duration for which a single-action control button carried on a frame of the device is pressed automatically determines an image stabilization mode for on-board processing of captured image data. In one example, an above-threshold press duration automatically activates a less rigorous image stabilization mode, while button release before expiry of the threshold automatically activates a more rigorous photo stabilization mode.

20 Claims, 8 Drawing Sheets

Related U.S. Application Data continuation of application No. 14/841,097, filed on Aug. 31, 2015, now Pat. No. 10,334,154.

(56) References Cited

U.S. PATENT DOCUMENTS

| | | |
|---|---|---|
| 7,173,651 B1 | 2/2007 | Knowles |
| 7,411,493 B2 | 8/2008 | Smith |
| 7,535,890 B2 | 5/2009 | Rojas |
| 8,131,597 B2 | 3/2012 | Hudetz |
| 8,199,747 B2 | 6/2012 | Rojas et al. |
| 8,332,475 B2 | 12/2012 | Rosen et al. |
| 8,718,333 B2 | 5/2014 | Wolf et al. |
| 8,724,622 B2 | 5/2014 | Rojas |
| 8,874,677 B2 | 10/2014 | Rosen et al. |
| 8,909,679 B2 | 12/2014 | Root et al. |
| 8,995,433 B2 | 3/2015 | Rojas |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,191,776 B2 | 11/2015 | Root et al. |
| 9,204,252 B2 | 12/2015 | Root |
| 9,443,227 B2 | 9/2016 | Evans et al. |
| 9,489,661 B2 | 11/2016 | Evans et al. |
| 9,491,134 B2 | 11/2016 | Rosen et al. |
| 10,334,154 B2 | 6/2019 | Yan et al. |
| 10,382,669 B1 | 8/2019 | Yan et al. |
| 2011/0202598 A1 | 8/2011 | Evans et al. |
| 2012/0019704 A1 | 1/2012 | Levey |
| 2012/0209924 A1 | 8/2012 | Evans et al. |
| 2014/0055633 A1 | 2/2014 | Marlin et al. |
| 2014/0266988 A1 | 9/2014 | Fisher et al. |
| 2015/0009309 A1 | 1/2015 | Heinrich et al. |
| 2015/0138064 A1 | 5/2015 | Li et al. |
| 2017/0264817 A1 | 9/2017 | Yan et al. |

OTHER PUBLICATIONS

"U.S. Appl. No. 14/841,097, Non Final Office Action dated Jun. 20, 2018", 8 pgs.

"U.S. Appl. No. 14/841,097, Non Final Office Action dated Jul. 5, 2017".

"U.S. Appl. No. 14/841,097, Notice of Allowance dated Feb. 6, 2019", 8 pgs.

"U.S. Appl. No. 14/841,097, Response filed Jan. 5, 2018 to Non Final Office Action dated Jul. 5, 2017", 12 pgs.

"U.S. Appl. No. 14/841,097, Response filed May 5, 2017 to Restriction Requirement dated Jan. 4, 2017", 9 pgs.

"U.S. Appl. No. 14/841,097, Response filed Jun. 6, 2018 to Final Office Action dated Feb. 6, 2018", 11 pgs.

"U.S. Appl. No. 14/841,097, Response filed Nov. 20, 2018 to Non-Final Office Action dated Jun. 20, 2018", 14 pgs.

"U.S. Appl. No. 14/841,097, Restriction Requirement dated Jan. 4, 2017", 6 pgs.

"U.S. Appl. No. 16/293,213, Notice of Allowance dated Apr. 3, 2019", 8 pgs.

"International Application Serial No. PCT/US2016/049665, International Preliminary Report on Patentability dated Mar. 15, 2018", 9 pgs.

"International Application Serial No. PCT/US2016/049665, International Search Report dated Nov. 28, 2016", 4 pgs.

"International Application Serial No. PCT/US2016/049665, Written Opinion dated Nov. 28, 2016", 6 pgs.

Leyden, John, "This SMS will self-destruct in 40 seconds", [Online] Retrieved from the internet: <URL: http://www.theregister.co.uk/2005/12/12/stealthtext/>, (Dec. 12, 2005), 1 pg.

AUTOMATED ADJUSTMENT OF IMAGE STABILIZATION MODE

PRIORITY

This application is a continuation of and claims the benefit of priority of U.S. patent application Ser. No. 16/293,213, filed on Mar. 5, 2019, which is a continuation of and claims the benefit of priority of U.S. patent application Ser. No. 14/841,097, filed on Aug. 31, 2015, both of which are hereby incorporated by reference herein in their entirety.

BACKGROUND

The recording of visual media using portable electronic devices can be performed in a wide-ranging variety of ambient conditions. Some portable devices, such as smart phones or smart glasses often do not provide for complex control mechanisms to allow manual adjustment of various image capture parameters. This can frustrate efforts to give accurate effect to the intention of a user capturing photo and/or video images using such devices.

These difficulties are in some instances exacerbated by the absence from the device of sensing equipment such as that typically forming part of more sophisticated single-purpose digital cameras, or provision on the device of less sophisticated or less costly sensing equipment.

Moreover, photos and videos taken with such portable and/or wearable multi-purpose devices are often to be captured on the spur of the moment or without excessive preparatory setup of the camera parameters. These factors can result in underwhelming results and can in some cases cause non-optimal on-device resource utilization.

BRIEF DESCRIPTION OF THE DRAWINGS

Various ones of the appended drawings illustrate merely example embodiments of the present disclosure and should not be considered as limiting its scope.

DETAILED DESCRIPTION

Figure 1:
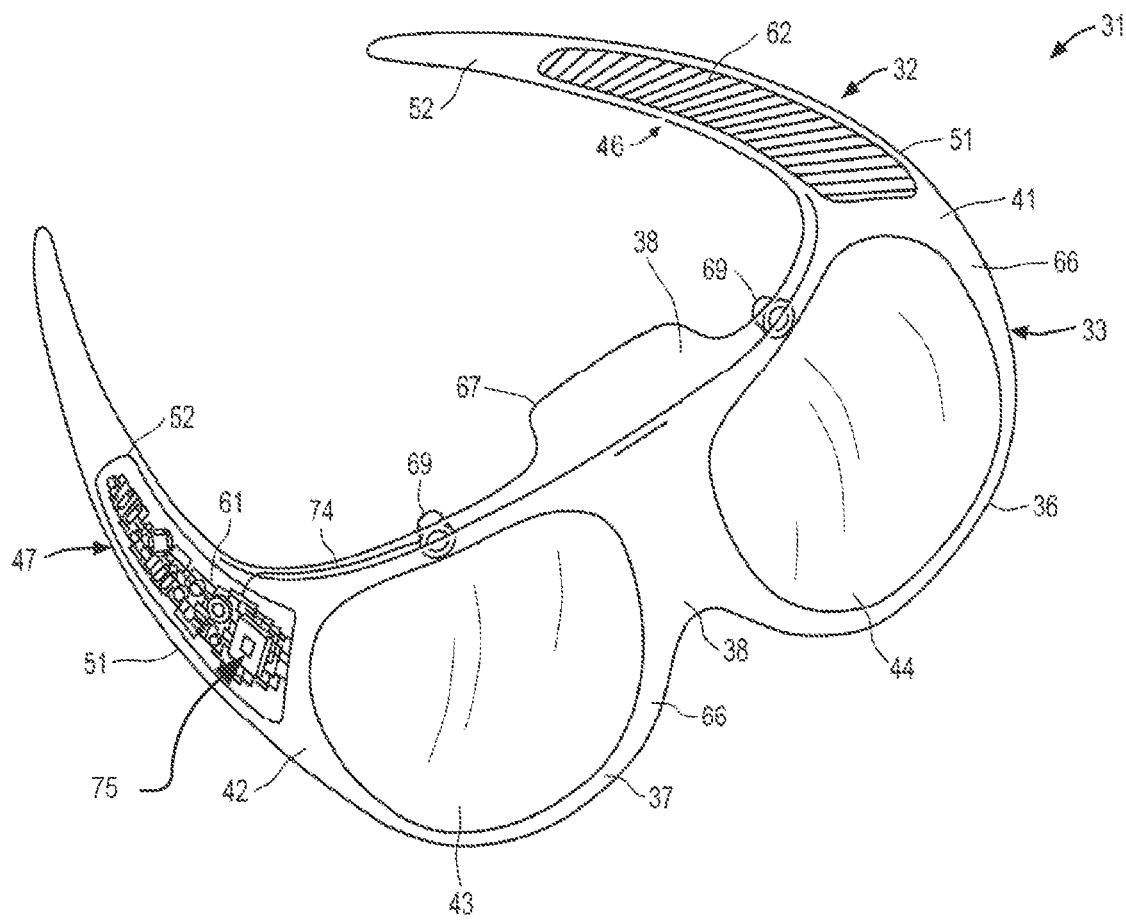
FIG. 1 is a schematic three-dimensional view of a portable electronic device in the form of electronics-enabled article of eyewear with automatically adjustable image-capturing functionality according to one example embodiment.

The description that follows discusses illustrative embodiments of the disclosure. In the following description, for the purposes of explanation, numerous specific details are set forth in order to provide an understanding of various embodiments of the disclosed subject matter. It will be evident, however, to those skilled in the art, that embodiments of the disclosed subject matter may be practiced without these specific details. In general, well-known instruction instances, protocols, structures, and techniques are not necessarily shown in detail.

According to one aspect of this disclosure, a portable electronic device with image capturing capabilities is provided with functionalities for automated and/or semi-automated adjustment of one or more image capturing parameters based on an input attribute of user engagement with a single-action haptic input mechanism. In some embodiments, automated and/or semi-automated adjustment of image capture parameters is in addition based on an image metric calculated from image data captured by the device.

The adjustable image capture parameters in some embodiments comprise parameters for on-board processing of raw image data captured by a sensor of the camera, e.g., being directed to processing operations performed by the device between (a) the capturing of image data by the camera sensor (e.g., a charge-coupled device) and (b) display of corresponding video/photo images to a user for viewing or previewing the captured visual media. Examples of such image capturing parameters include image stabilization parameters, for example being adjustable between a photographic stabilization mode and an image stabilization mode. Instead, or in addition, the adjustable image-capturing parameters in some embodiments comprise parameters pertaining to operation of the camera sensor and/or to parameters that affect exposure of the sensor. Examples of such image capture parameters include camera sensitivity (e.g., ISO levels), shutter speed, aperture size, and flash settings.

In some embodiments, the user input attribute comprises a duration for which a camera control button is pressed automatically determines whether or not an image stabilization parameter for captured visual content is set to a video stabilization mode or to a photo stabilization mode. As noted above, it is to be appreciated that the one or more image capture parameters can include: parameters for initial capturing of image data by a camera sensor, and/or parameters for on-board processing of the device before presentation of the captured visual content to the user for view or previewing.

In some embodiments, the device is configured for processing image data captured by an on-board camera to determine the image metric, and to perform an automated adjustment action based on the determined value of the image metric. In some embodiments, the image metric is an image brightness metric which comprises a brightness value for one or more video frames represented by the captured image data. In some embodiments, the image metric comprises a count of successive video frames having a brightness value that transgresses a predefined threshold brightness.

In such cases, automated adjustment of a camera sensitivity parameter (e.g., camera sensor ISO settings) may be automatically or semi-automatically adjusted if the count of threshold-transgressing frames exceed a predetermined frame count threshold. Automatic parameter adjustment comprises adjustment of the relevant parameter without submitting the adjustment to the user for acceptance or rejection. Semi-automated parameter adjustment conversely comprises notifying the user of a proposed adjustment, with the adjustment being dependent on subsequent user commission or omission.

Figure 2:
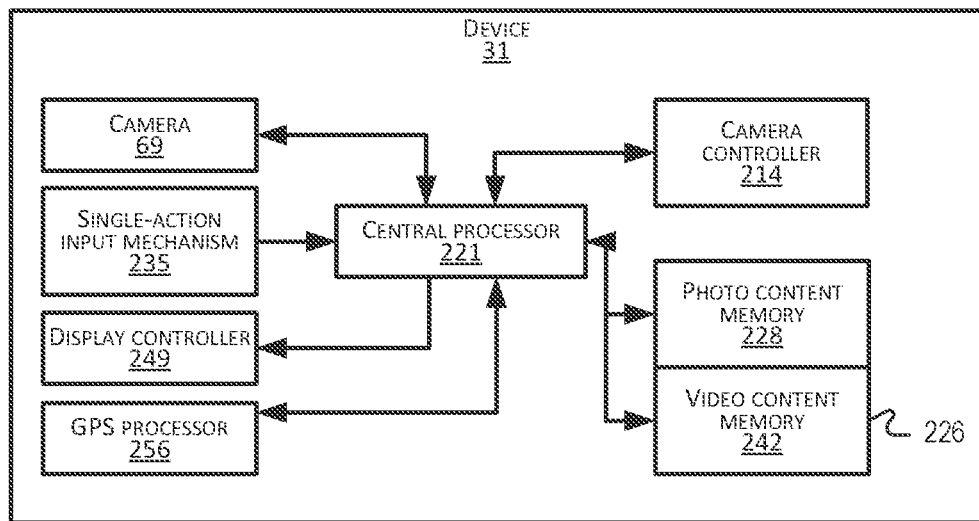
FIG. 2 is a schematic block diagram of selected functional components of a portable electronic device with automatically adjustable image-capturing functionality according to an example embodiment.

Various aspects and alternative configurations will now be described with reference to more detailed example embodiments. FIGS. 1-2 illustrate an example embodiment of an electronic device implementing various disclosed techniques, the electronic device being in the example form of an article of eyewear constituted by electronics-enabled glasses 31. FIG. 1 shows a front perspective view of the glasses 31 which, in accordance with this example embodiment, provide for auto-tuning of one or more image-capture parameter responsive to user engagement with a single-action input mechanism.

The glasses 31 can include a frame 32 made from any suitable material such as plastic or metal, including any suitable shape memory alloy. The frame 32 can have a front piece 33 that can include a first or left lens, display or optical element holder 36 and a second or right lens, display or optical element holder 37 connected by a bridge 38. The front piece 33 additionally includes a left end portion 41 and a right end portion 42. A first or left optical element 43 and a second or right optical element 44 can be provided within respective left and right optical element holders 36, 37. Each of the optical elements 43, 44 can be a lens, a display, a display assembly or a combination of the foregoing. In some embodiments, for example, the glasses 31 provided with an integrated near-eye display mechanism that enables, for example, display to the user of preview images for visual media captured by cameras 69 of the glasses 31.

Frame 32 additionally includes a left arm or temple piece 46 and a second arm or temple piece 47 coupled to the respective left and right end portions 41, 42 of the front piece 33 by any suitable means such as a hinge (not shown), so as to be coupled to the front piece 33, or rigidly or fixably secured to the front piece so as to be integral with the front piece 33. Each of the temple pieces 46 and 47 can include a first portion 51 that is coupled to the respective end portion 41 or 42 of the front piece 33 and any suitable second portion 52, such as curved or arcuate piece, for coupling to the ear of the user. In one embodiment the front piece 33 can be formed from a single piece of material, so as to have a unitary or integral construction. In one embodiment, such as illustrated in FIG. 1 the entire frame 32 can be formed from a single piece of material so as to have a unitary or integral construction.

Glasses 31 can include a computing device, such as computer 61, which can be of any suitable type so as to be carried by the frame 32 and, in one embodiment of a suitable size and shape, so as to be at least partially disposed in one of the temple pieces 46 and 47. In one embodiment, as illustrated in FIG. 1, the computer 61 is sized and shaped similar to the size and shape of one of the temple pieces 46, 47 and is thus disposed almost entirely if not entirely within the structure and confines of such temple pieces 46 and 47. In one embodiment, the computer 61 can be disposed in both of the temple pieces 46, 47. The computer 61 can include one or more processors with memory, wireless communication circuitry, and a power source. The computer 61 comprises low-power circuitry, high-speed circuitry, and a display processor. Various other embodiments may include these elements in different configurations or integrated together in different ways. Additional details of aspects of computer 61 may be implemented as described with reference to the description that follows.

The computer 61 additionally includes a battery 62 or other suitable portable power supply. In one embodiment, the battery 62 is disposed in one of the temple pieces 46 or 47. In the glasses 31 shown in FIG. 1 the battery 62 is shown as being disposed in left temple piece 46 and electrically coupled using connection 74 to the remainder of the computer 61 disposed in the right temple piece 47. The one or more input and output devices can include a connector or port (not shown) suitable for charging a battery 62 accessible from the outside of frame 32, a wireless receiver, transmitter or transceiver (not shown) or a combination of such devices.

Glasses 31 include digital cameras 69. Although two cameras are depicted, other embodiments contemplate the use of a single or additional (i.e., more than two) cameras. For ease of description, various features relating to the cameras 69 will further be described with reference to only a single camera 69, but it will be appreciated that these features can apply, in suitable embodiments, to both cameras 69.

In various embodiments, glasses 31 may include any number of input sensors or peripheral devices in addition to cameras 69. Front piece 33 is provided with an outward facing, forward-facing or front or outer surface 66 that faces forward or away from the user when the glasses 31 are mounted on the face of the user, and an opposite inward-facing, rearward-facing or rear or inner surface 67 that faces the face of the user when the glasses 31 are mounted on the face of the user. Such sensors can include inwardly-facing video sensors or digital imaging modules such as cameras that can be mounted on or provided within the inner surface 67 of the front piece 33 or elsewhere on the frame 32 so as to be facing the user, and outwardly-facing video sensors or digital imaging modules such as the cameras 69 that can be mounted on or provided with the outer surface 66 of the front piece 33 or elsewhere on the frame 32 so as to be facing away from the user. Such sensors, peripheral devices or peripherals can additionally include biometric sensors, location sensors, accelerometers, or any other such sensors.

The glasses 31 further include an example embodiment of a camera control mechanism or user input mechanism comprising a camera control button 75 mounted on the frame 32 for haptic or manual engagement by the user. The control button 75 provides a bi-modal or single-action mechanism in that it is disposable by the user between only two conditions, namely an engaged condition and a disengaged condition. In this example embodiment, the control button 75 is a pushbutton that is by default in the disengaged condition, being depressable by the user to dispose it to the engaged condition. Upon release of the depressed control button 75, it automatically returns to the disengaged condition.

In other embodiments, the single-action input mechanism can instead be provided by, for example, a touch button comprising a capacitive sensor mounted on the frame 32 adjacent its surface for detecting the presence of a user's finger, to dispose the touch-sensitive button to the engaged condition when the user touches a finger to the corresponding spot on the outer surface of the frame 32. It will be appreciated that the above-described push button 75 and capacitive touch button are but two examples of a haptic input mechanism for single-action control of the camera 69, and that other embodiments may employ different single-action haptic control arrangements.

FIG. 2 is a schematic diagram illustrating some of the components the example electronic device 31 in the form of the glasses 31. Note that a corresponding arrangement of interacting machine components can apply to embodiments in which an electronic device consistent with the disclosure comprises, for example, a mobile electronic device such as a smartphone (e.g., such as that described with reference to FIG. 5), a tablet, or a digital camera. The computer 61 (FIG. 1) of the glasses 31 includes a processor 221 in communication with an onboard memory 226. The central processor 221 may be a central processing unit and/or a graphics processing unit. The memory 226 in this example embodiment comprises a combination of flash memory and random access memory.

The device 210 further includes a camera controller 214 in communication with the central processor 221 and the camera 69. The camera controller 214 comprises circuitry configured to control recording of either photographic content or video content based upon processing of control signals received from the single action input mechanism (indicated generally by item 235 in FIG. 2) that includes the control button 75, and to provide for automatic adjustment of one or more image-capture parameters pertaining to capturing of image data by the camera 69 and on-board processing of the image data prior to persistent storage thereof and/or to presentation thereof to the user for viewing or previewing.

In some embodiments, the camera controller 214 comprises permanently configured circuitry, such as firmware or an application-specific integrated circuit (ASIC) configured to perform the various functions described. In other embodiments, the camera controller 214 may comprise a dynamically reconfigurable processor executing instructions that temporarily configure the processor to execute the various functions described.

The camera controller 214 interacts with the memory 226 to store, organize, and present image content in the form of photo content and video content. To this end, the memory 226 in this example embodiment comprises a photo content memory 228 and a video content memory 242. The camera controller 214 is thus, in cooperation with the central processor 221, configured to receive from the camera 69 image data representative of digital images captured by the camera 69 in accordance with some of the image capture parameters, to process the image data in accordance with some of the image capture parameters, and to store the processed image data in an appropriate one of the photo content memory 228 and the video content memory 242.

The camera controller 214 is further configured to cooperate with a display controller 249 to cause display on a display mechanism incorporated in the glasses 31 of selected photos and videos in the memory 226, thus to provide previews of captured photos and videos.

The single-action input mechanism 235 is communicatively coupled to the central processor 221 and the camera controller 214 to communicate signals representative of current state of the camera control button 75, thereby to communicate to the camera controller 214 whether or not the camera controller 214 is currently being pressed. The camera controller 214 further communicates with the central processor 221 regarding the input signals received from the single action input mechanism 235. In one embodiment, the camera controller 214 is configured to process input signals received via the single action input mechanism 235 to determine whether a particular user engagement with the camera control button 75 is to result in a recording of video content or photographic content, and/or to dynamically adjust one or more image-capturing parameters based on processing of the input signals. For example, pressing of the camera control button 75 for longer than a predefined threshold duration causes the camera controller 214 automatically to apply relatively less rigorous video stabilization processing to captured video content prior to persistent storage and display thereof. Conversely, pressing of the camera control button 75 for shorter than the threshold duration in such an embodiment causes the camera controller 214 automatically to apply relatively more rigorous photo stabilization processing to image data representative of one or more still images. These features will be described in greater detail with reference to the flowchart of FIG. 3 below.

In this embodiment, the camera controller 214 is also configured for cooperating with the camera 69 to dynamically adjust one or more image-capturing parameters based on at least one image metric calculated based on image data representative of digital images captured by the camera 69. As will be described in greater detail with reference to FIG. 3, this example embodiment provides for automated, dynamic adjustment or tuning of a sensitivity parameter (e.g., an ISO level) of the camera 69 based on a calculated brightness value for multiple digital frames recorded by the camera 69.

The glasses 31 may further include various components common to mobile electronic devices such as smart glasses or smart phones, for example including a display controller 249 for controlling display of visual media (including photographic and video content captured by the camera 69) on a display mechanism incorporated in the device, and may also include a GPS processor 256. Note that the schematic diagram of FIG. 2 is not an exhaustive representation of all components forming part of the glasses 31.

Figure 3:
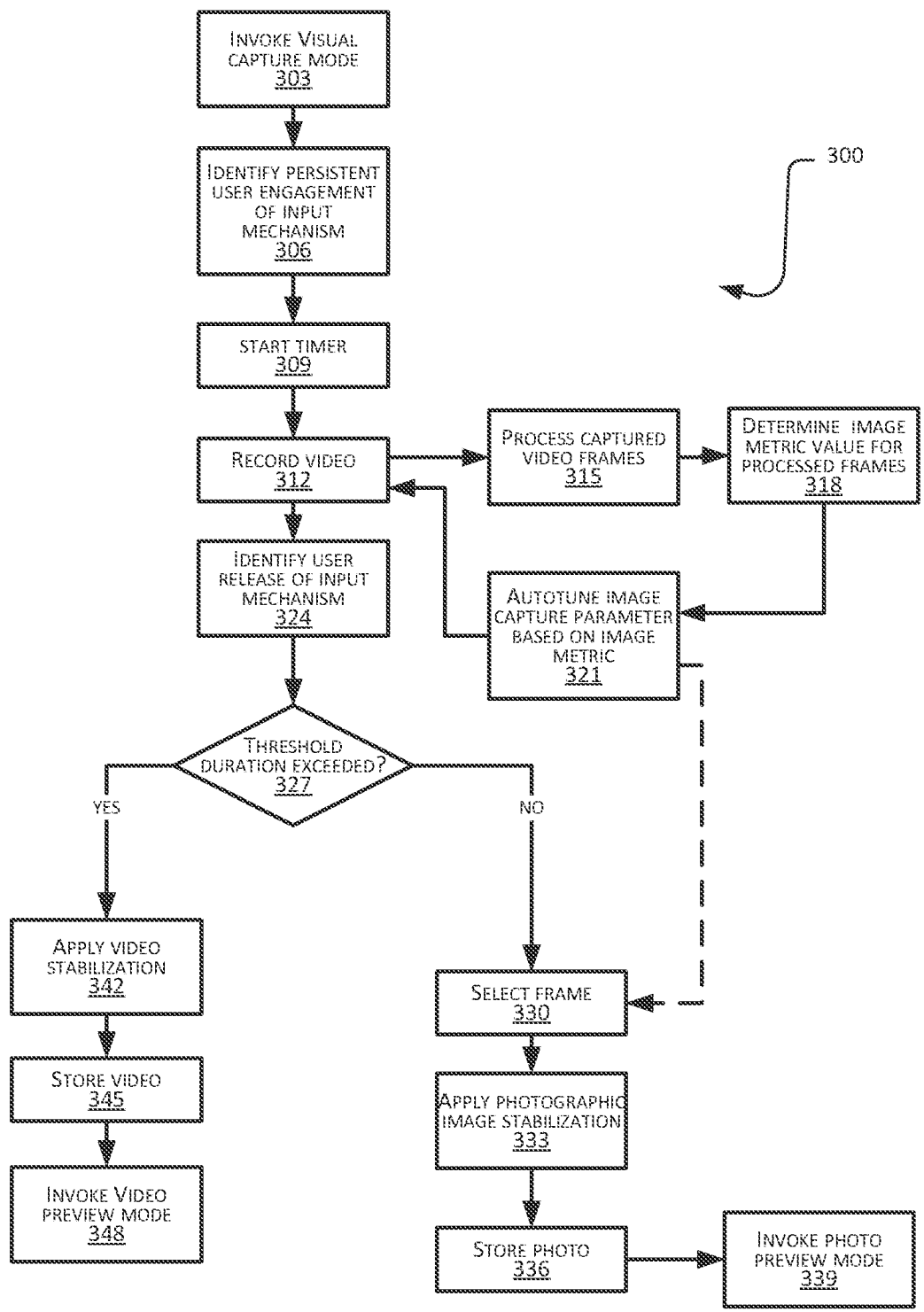
FIG. 3 is a schematic flow diagram of an example method of automated control of an electronic image capturing device forming part of a portable electronic device in accordance with an example embodiment

FIG. 3 shows a flowchart illustrating an example method 300 of processing operations which the camera controller 214 is configured to perform, in accordance with an example embodiment. At operation 303, a visual capture mode is invoked. In some embodiments, the visual capture mode is invoked by user-selected activation of a corresponding mode on the glasses 31 or by launching of an application that has image-capturing functionality. In other embodiments, the visual capture mode may be invoked automatically in response to user engagement with the single-action input mechanism 235, e.g. in response to haptic engagement of the camera control button 75.

At operation 306, user engagement with the input mechanism in the example form of the camera control button 75 is detected. As described previously, the camera control button 75 is in this example embodiment disposable to an activated or engaged condition by haptic or manual user engagement therewith. Disposal of the control button 75 to the deactivated or disengaged condition can be achieved by user release thereof. In other embodiments, for example in embodiments where the automated image capture control techniques described herein are provided in cooperation with a smartphone or tablet device, the mechanism may comprise a soft button displayed on a touch sensitive screen of the device (see, e.g., soft button 525 in FIG. 5).

In response to the user's pressing of the camera control button 75, a timer is started, at operation 309, and video content captured by the camera 69 is recorded, at operation 312, by temporary storage of image data representative of the video content. The timer is executed under control of the central processor 221 and/or the camera controller 214. It will be appreciated that the media content in conventional fashion comprises a sequence of still digital images captured by the camera 69. Each of these still digital images forming part of the video content is referred to as a respective video frame.

In this example embodiment, the camera controller 214 is configured for real-time processing (at operation 315) of a plurality of the recorded frames, to determine (at operation 318) a value for an image metric of the processed frames, and automatically to adjust (at operation 321) a corresponding image capture parameter of the camera 69 or the camera controller 214 based on the image metric value determined from the processed frames. Further frames recorded subsequent to the automatic adjustment or tuning (at 321) are thus captured and/or processed in accordance with the adjusted parameter values. The plurality of frames which are processed to calculate the image metric is in this example embodiment constituted by a predefined number of consecutive frames captured at the outset of the recording (at operation 312) responsive to pressing of the camera control button 75. Here, the image data on which auto-adjustment of image capture parameters is based is for the first ten video frames captured subsequent to pressing of the camera control button 75. In other embodiments, image metric calculation can be based on a single frame, or on a plurality of non-consecutive frames taken at intervals corresponding to multiple omitted intervening frames.

The glasses 31 are in this example embodiment configured automatically to adjust a sensitivity parameter, in this example expressed as an ISO level, that determines sensitivity to light incident thereon of an optical sensor provided by a charge coupled device forming part of the camera 69. The image metric value upon which such dynamic auto-adjustment is based is in this instance a brightness metric indicative of a brightness attribute of the images represented by the plurality of processed frames. Note that other image capture parameters may in other embodiments be automatically adjustable responsive to brightness metric values. In some embodiments, for example, a combination of f-stop and shutter speed may be dynamically adjusted instead of or in conjunction with ISO adjustment.

In the present example, the camera 69 of the glasses 31 is automatically switchable between only two brightness modes, namely a normal mode (corresponding to relatively lower ISO levels) and a low-light mode (corresponding to relatively higher ISO levels). In other embodiments, however, the light sensitivity parameter (and/or any other applicable image capture parameters) may be automatically adjustable between a greater number of distinct levels, or may in some instances be adjustable along a continuous spectrum of values.

The brightness metric upon which automated ISO-level adjustment is based in the example embodiment of FIG. 3 comprises a count of the successive number of processed video frames that have a brightness value which transgresses a predefined threshold brightness level. Here, the brightness level of a video frame is defined as an exposure value of the image, which is derivable by the camera controller 214 based on processing of the image data representative of the corresponding frame. While the brightness level of a single frame may in some embodiments be used for adjustment of the camera ISO level, the defined criteria for automated light mode switching in this embodiment is, as mentioned, that the number of successive frames with an exposure value that transgresses the applicable brightness threshold exceed a predefined threshold number of frames.

Different measures for determining image brightness from a captured image may, instead or in addition, be employed in other embodiments. Some alternative examples for calculating image brightness include, but are not limited to: the number of blacked out pixels in a frame; the number of low-luminosity pixels in a frame, each low-luminosity pixel having a luminosity value lower than a predefined threshold; an average luminosity value for pixels in the image; an average luminosity value for macro-pixels in the frame; and a median luminosity of pixels and/or macro-pixels in the frame. A person skilled in the art will appreciate that a variety of additional or alternative measures can be employed for providing a quantifiable measure of ambient lighting conditions based on captured image data.

In some embodiments, the same threshold number of frames may apply for up-switching and for down-switching the ISO-setting of the camera 69. In such instances, for a certain threshold number—say, ten frames—the camera 69 will automatically be set to the low-light mode when more than ten successive frames fall below the applicable brightness threshold while the camera 69 is in the normal lighting mode, and the camera 69 will automatically be set to the normal-lighting mode when more than ten successive frames fall above the applicable brightness threshold while the camera 69 is in the low-light mode. In this example embodiment, though, different threshold numbers apply for the count of brightness-threshold transgressing frames in up-switching and down-switching, respectively. In particular, as will be described below with reference to FIG. 4, a larger number of brightness threshold-transgressing frames are required for switching from the normal-lighting mode to the low-light mode than are required for switching from the low-light mode to the normal-lighting mode.

Likewise, the same brightness value may in some embodiments apply as threshold value for up-switching and for down-switching the ISO setting of the camera 69. In this example embodiment, however, a lower image brightness value is used for searching the ISO setting from the normal-lighting mode to the low-light mode than that which is used for switching the ISO setting from the low-light mode to the normal-lighting mode. The camera controller 214 is therefore biased towards setting the camera 69 to the normal-lighting mode.

Figure 4:
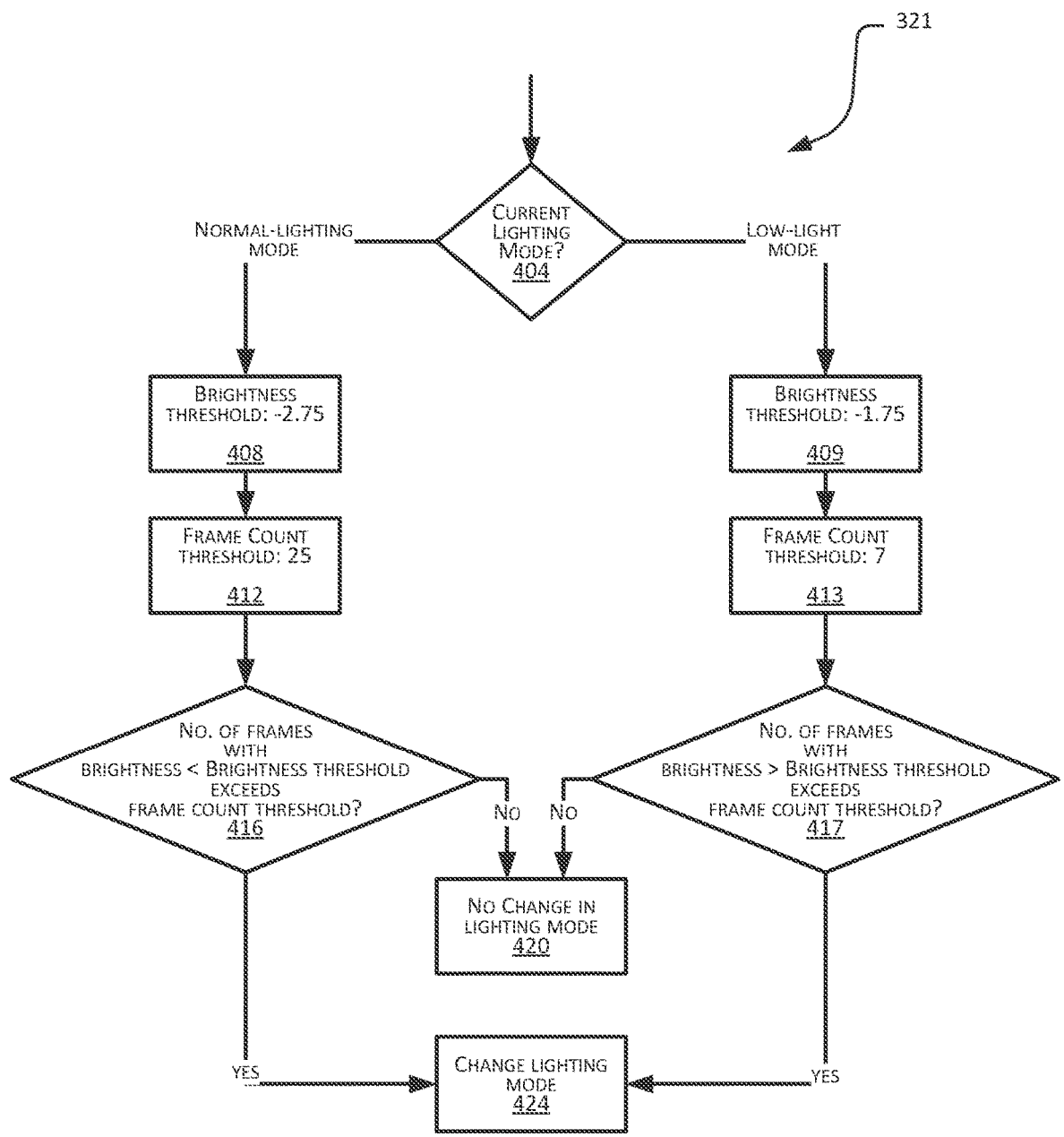
FIG. 4 is a schematic flow diagram of an automated adjustment operation for automated disposal of a sensitivity parameter of a camera forming part of a portable electronic device between a low-light mode and a normal-lighting mode, according to an example embodiment.

Turning now to FIG. 4, therein is shown a flow-chart of one example embodiment of performing operation 321 (FIG. 3) for automated adjustment of an image capture parameter, in this example to adjust the ISO settings of the camera 69 between the low-light mode and the normal-lighting mode. At operation 404, the current lighting mode of the camera 69 is determined. If the camera 69 is currently in the low-light mode, the applicable brightness threshold is an exposure value of −2.75 (at operation 408) and the threshold frame count for the number of consecutive threshold-transgressing frames is 25 (at operation 412). At operation 416, the camera controller 214 automatically determines whether or not the processed video frames include more than 25 consecutive frames with a brightness value of lower than −2.75. If so, the lighting mode is changed (at operation 424) to the low-light mode, so that the camera 69 operates at a higher ISO value. If not, no change the lighting mode is made (corresponding to operation 420), so that the camera 69 continues to function in the normal-lighting mode.

If, however, at operation 404, it is determined that the camera 69 is currently set to the low-light mode, the brightness threshold is set to an exposure value of −1.75 (at operation 409) and the threshold frame count for the number of consecutive threshold-transgressing frames is set to −seven (at operation 413). At operation 417, the camera controller 214 automatically determines whether or not the processed video frames include more than seven consecutive frames with a brightness value of above −1.75. If so, the lighting mode is changed (at operation 424) to the normal-lighting mode, so that the camera operates at relatively lower ISO values. If not, no change is made to the lighting mode of the camera 69 (corresponding to operation 420), so the camera 69 continues to function in the low-light mode.

Note that in the present example embodiment, the lighting mode of the camera 69 is set by default to the normal-lighting mode at the outset of an image-capturing session. Any automatic adjustment to the lighting mode, made consistent with the flowchart 321 of FIG. 4, is persistent until the session is ended (e.g., by powering down of the glasses or exiting of an image capturing application) or until the lighting mode is automatically changed in the opposite direction (at operation 424) during a later iteration of the auto-tuning operation of operation 321.

Note that the glasses 31 in this example embodiment do not have incorporated therein any light sensors to directly measure ambient light levels. Contrary to automated camera sensitivity adjustment in some existing digital cameras, the described automated adjustment action performed by the camera controller 214 is thus executed based not on measurement data from a dedicated light sensor, but is instead based on the processing of image data captured by the camera 69. Some embodiments may provide for automated parameter adjustment based on both measurement signals provided by an on-board light sensor combined with the described processing of live image data sourced from the camera 69.

It is again emphasized that the example operation of FIG. 4 pertains only to automatic adjustment of a single image capture parameter (here, camera ISO level) and that different auto-tuning metrics can be applied in other embodiments. Note that processes similar or corresponding to that of FIG. 4 can in some embodiments be performed instead or in addition for automated adjustment of different image capture parameters based on the processing of image data from the camera 69. Other example image capture parameters which can be auto-adjusted based on the image data include, but are not limited to:

(a) camera shutter speed based on one or more of an image brightness metric and an image sharpness/blurriness metric;

(b) camera exposure settings (e.g., f-stop values) based on one or more of an image brightness metric and an image sharpness/blurriness metric;

(c) camera focus settings based, e.g., on an image sharpness/blurriness metric;

(d) camera white balance settings based for example on an image colorization metric;

(e) camera flash settings based for example on an image brightness metric; and (f) image stabilization settings based on one or more of an image brightness metric and an image sharpness/blurriness metric, so that automatic adjustment can be made to the amount of on-board processing devoted to photographic image stabilization.

Returning now to FIG. 3, video content is continuously recorded (at 312) and the timer continues to run in response to persistent engagement with the input mechanism 235, here comprising continued pressing of the camera control button 75. Release of the input mechanism is identified, at operation 324, when the user releases the camera control button 75. The timer is then stopped, and the recording of video content to a buffer memory ceases.

At operation 327, the activation duration (as indicated by the elapsed time recorded by the timer) is evaluated by the camera controller 214 against a predefined duration threshold. In this example embodiment, the duration threshold is three seconds, but it will be appreciated that the threshold duration may be different in other embodiments.

If, at operation 327, the threshold duration is exceeded, then the camera controller 214 interprets the user engagement with the camera control button 75 to indicate an intention to record video content, and the recorded video content is then processed, at operation 342, and stored, at operation 345. In this embodiment, processing of the video content, at operation 342, comprises application of video stabilization processing to the raw image data captured by the camera 69. As will be appreciated by persons skilled in the art, video stabilization processing is in applications such as that described relatively less rigorous than photographic stabilization processing, and is therefore less resource intensive.

The camera controller 214 is in this example embodiment configured to invoke a video preview mode, at operation 348, subsequent to processing of the raw video data (at 342) and storage of the processed video data (at 345).

If, however, at operation 327, the threshold duration is not exceeded (i.e., if the button 75 is in this example pressed for less than three seconds), a frame of the video is selected, at operation 330, for providing a digital photograph. The raw image data representative of the selected frame is then processed, at operation 333, to apply thereto photographic image stabilization. Thereafter, the stabilized frame is stored, at operation 336, as a digital photograph in the photo content memory 228, and a photo preview mode is invoked, at 339, by the camera controller 214. As mentioned such photographic image stabilization is more rigorous and therefore more resource intensive than the video stabilization of operation 342.

It will be appreciated that the particular image stabilization mode which is to be applied to the raw image data prior to presentation thereof to the user is in this embodiment one of the image capture parameters of the glasses 31 which is automatically adjusted in response to single-action input for capturing visual content. Adjustment of the stabilization parameter (e.g., whether or not to apply the relatively more rigorous photographic stabilization processing) is here based, however, on a user input attribute pertaining to user engagement with the single-action bi-modal input mechanism provided by the camera control button 75. In particular, the activation duration (here, the length of the button press) in this instance automatically determines the manner of image stabilization processing that is to be applied to the captured image data prior to its presentation to the user for viewing or pre-viewing.

Note that, in some embodiments, the stabilization parameter may automatically be adjusted not between a more- and a less rigorous mode, as is the case in the example of FIG. 3, but may be adjusted between a deactivated mode (applicable to video content) in which no image stabilization is performed, and an activated mode (applicable to photographic content). In other embodiments, one or more parameters of a particular mode may automatically be adjusted based on processed image data captured by the camera. Thus, for example, one or more parameters of the photographic image stabilization at operation 333 may automatically be adjusted based on determination of image metric values determined at operation 318.

Some variations to the selection of a video frame for providing a digital photo may be employed in other embodiments. For example, a still frame taken immediately upon or shortly after pressing of the button 75 may be selected as the intended photo. In other embodiments, a final frame captured (thus corresponding to button release) may be selected to serve as basis for the captured digital photo.

Note also that, in this embodiment, auto-tuning or automatic adjustment of one of the image capture parameters (here, ISO settings) is performed during recording of the raw video data (at 312), so that frames captured subsequent to the parameter adjustment are captured by the camera in accordance with the adjusted parameters. Some embodiments may instead or in addition (as indicated by the broken line connecting operations 321 and 330 in FIG. 3) provide for adjustment of one or more image capture parameters to be applied during processing of the selected frame, subsequent to capturing of the raw image data.

Figure 5:
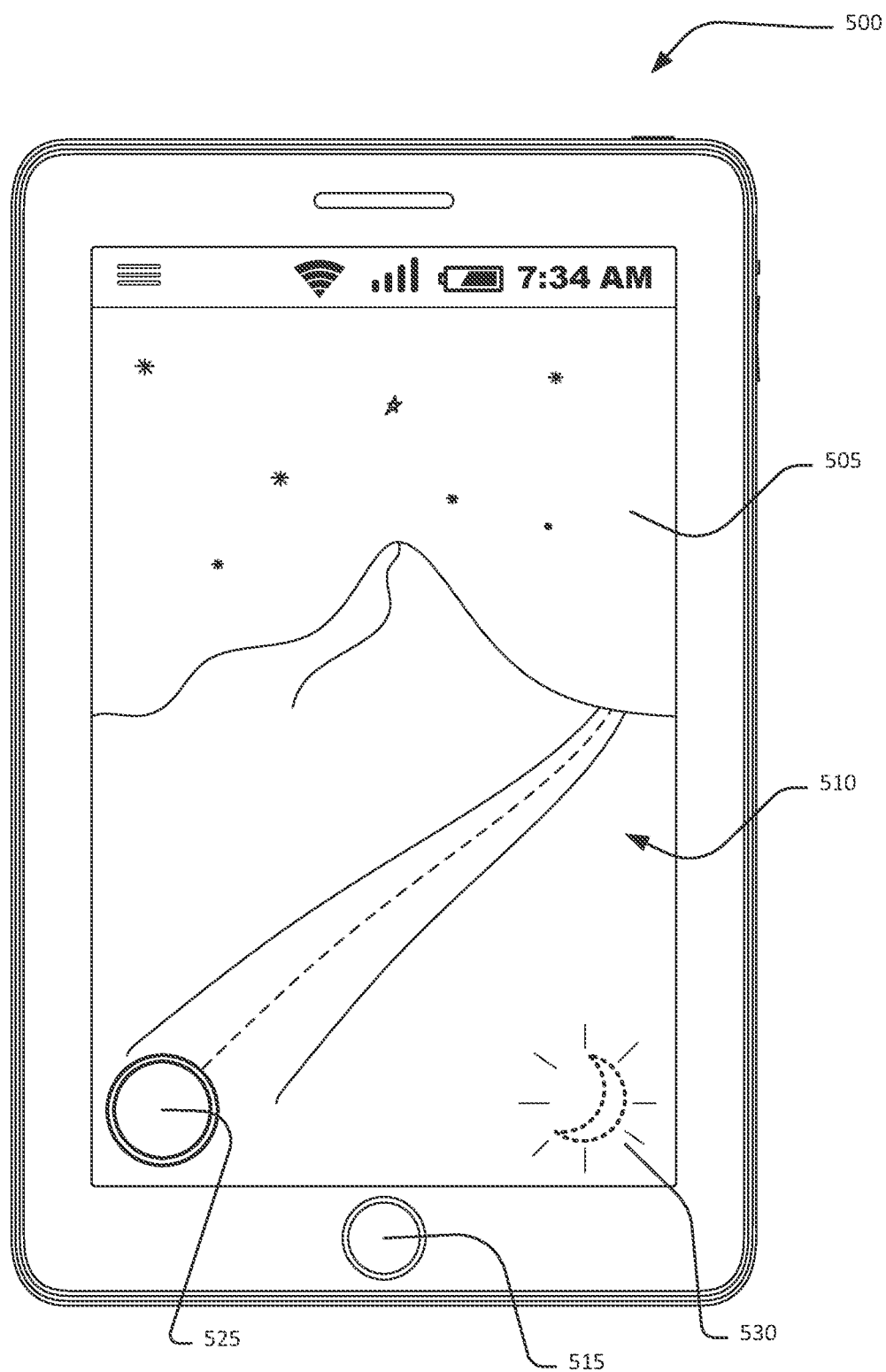
FIG. 5 is a schematic front view of a portable electronic device in the form of a smartphone with functionalities to perform automated adjustment actions with respect to image capture parameters, according to an example embodiment

Turning now to FIG. 5, therein is shown in another example embodiment of a portable electronic device with image capturing capabilities consistent with the disclosure. In this example, the device is a smartphone 500 with a conventional touchscreen 505 that provides for display of visual content and that is touch sensitive for receiving haptic input. The smart phone 500 has a master control button 515 that is in this example a mechanical pushbutton.

The smartphone 210 is provided with software that executes an application that provides amplified image-capturing and sharing capabilities. In one example, the application is a social media application provided by Snapchat, Inc.™

FIG. 5 illustrates an example user interface 510 generated during execution of the application. The user 510 includes a display of a current scene captured by a camera of the smartphone 500. The user interface 510 further includes a soft button 525 generated on the touchscreen 505 for receiving haptic input from the user to control camera operation. The soft button 525 thus corresponds in function to the camera control button 75 described with reference to FIG. 3.

The user interface 510 further includes a user-selectable user-interface element in the example form of a low-light icon that is automatically surfaced on the display when low-light conditions are identified by the smartphone 210 in a manner similar or analogous to that described with reference to method 321 in FIG. 4. Switching of the camera to the low-light mode is in this example dependent on user-selection of the low-light icon 530 within a predetermined interval when it surfaces. To facilitate notice of the low-light icon 530 by the user, the icon 530 in this example flashes or pulses when it is available for selection.

It will be appreciated that adjustment of the sensitivity parameter is thus in this example semi-automated, in that the automated adjustment action performed by the smartphone 500 comprises display of the low-light icon 530 for user selection. In some instances, no parameter adjustment is made unless the user actively selects the surfaced icon 530.

Figure 6:
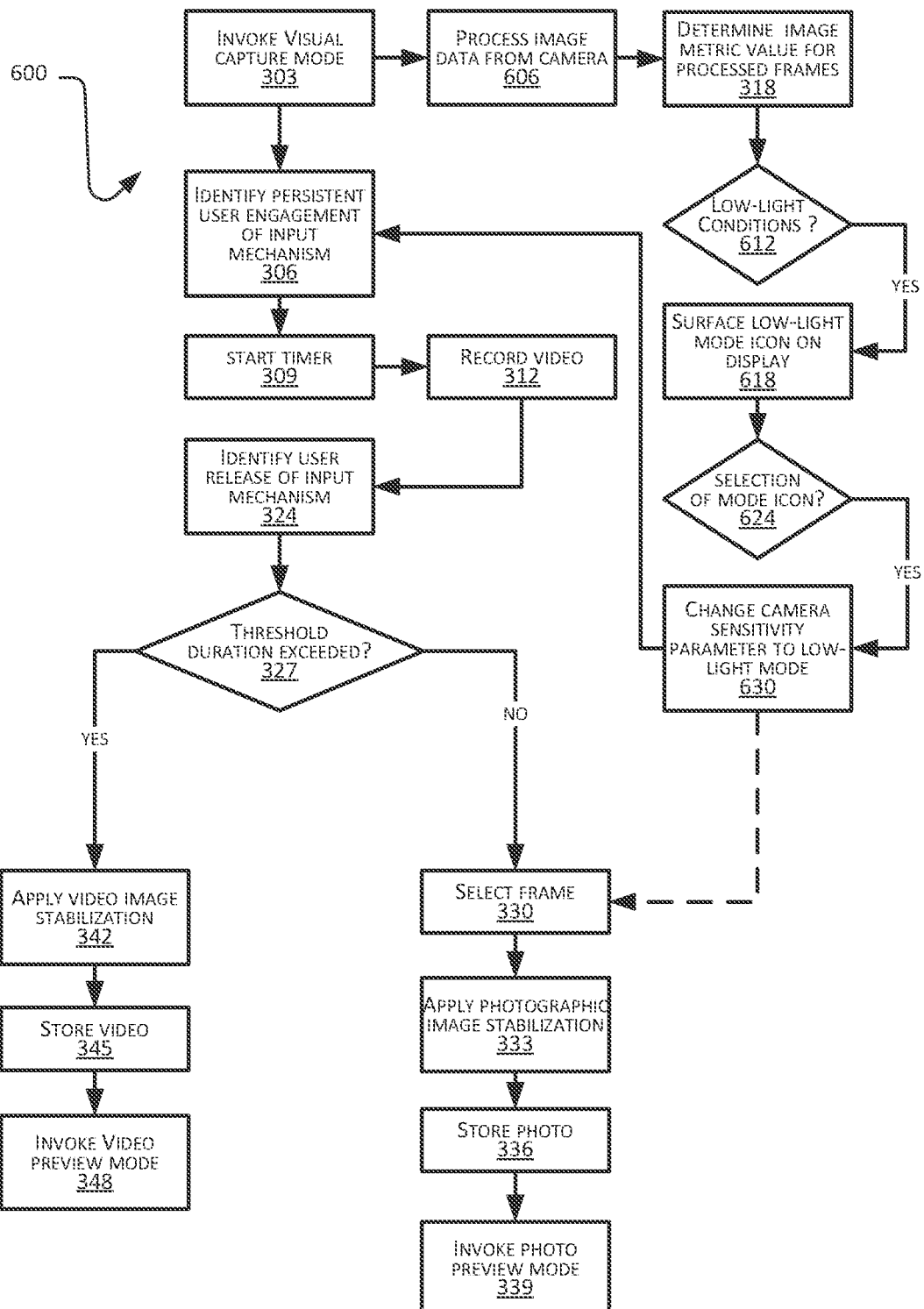
FIG. 6 is a schematic flow diagram of a method of operation of the example device of FIG. 5, according to an example embodiment

FIG. 6 shows a flowchart illustrating one example embodiment of a method 600 for operation of the smartphone 500. The method 600 corresponds largely to the method of FIGS. 3 and 4, with identical or corresponding operations being identically numbered in FIG. 3 and in FIG. 6. In method 600, invocation of the visual capture mode (at 303) comprises launching of the relevant application on the smartphone 210. Image data from the camera is processed (at 606) substantially immediately thereafter, without first requiring user engagement with the soft button 525.

Image metric determination (at 318) and low-light condition identification (at 612) then proceeds substantially similarly to the method 321 described in FIG. 3. If, however, low-light conditions are identified, the low-light icon 530 is surfaced on the user interface 510 (at operation 618) instead of automatically adjusting the lighting mode.

If, at 624, the user selects the low-light icon 530 by haptic engagement thereof, the camera sensitivity parameter is changed to the low-light mode, at operation 630. Otherwise, the normal-lighting mode subsists. In some embodiments, the low-light icon 530 is automatically faded out if the user fails to select it within a predetermined interval.

It will be seen that the above-described techniques represent one example embodiment of an aspect of the disclosure that provides a portable electronic device comprising: a frame; a camera mounted on the frame and configured to capture and process image data according to a group of image capture parameters; an input mechanism provided on the frame and configured for receiving user input to control operation of the camera; and a camera controller incorporated in the frame and configured to perform an automated adjustment action with respect to one or more of the group of image capture parameters of the camera based at least in part on a user input attribute pertaining to user engagement with the input mechanism to dispose the input mechanism to the engaged condition.

In some embodiments, the input mechanism may be a bi-modal mechanism, being disposable by a user exclusively between an engaged condition and a disengaged condition. The input mechanism may in some such embodiments be a haptic mechanism, for example comprising a button which is pressable by the user to dispose it from the disengaged condition to the engaged condition.

In some embodiments, the automated adjustment action may include automatically causing display of a user interface element on a user interface provided by the portable electronic device. In some such embodiments, the camera controller may be configured to modify the one or more image capture parameters responsive to user selection of the user interface element.

In some embodiments, the automated adjustment action may include automatically modifying the one or more image capture parameters, without requesting intervening user input to confirm or authorize the modification.

In some embodiments, the user input attribute may include an activation duration indicating a duration for which the input mechanism is disposed to the engaged condition during the user engagement.

In some embodiments, the input mechanism may include a control button carried by the frame of the portable electronic device, such that disposal of the input mechanism to the engaged condition comprises pressing of the control button by the user, the activation duration indicating a period for which the control button is continuously pressed by the user. In some embodiments, the control button is the only mechanism incorporated in the frame for receiving manual user input to control functioning of the camera. In some embodiments, the portable electronic device is an article of eyewear, the frame may be head-mountable for carrying one or more optical elements within a field of view of the user. The eyewear frame may in some embodiments carry the control button on an externally accessible surface as solitary control mechanism by which manual user control of camera operation is achievable.

In some embodiments, the one or more image capture parameters may include an image stabilization parameter adjustable by the camera controller between a more rigorous mode and a less rigorous mode, on-board image stabilization at the portable electronic device during image capture being relatively more resource intensive in the more rigorous mode than in the less rigorous mode.

In some embodiments, the image stabilization parameter is adjustable between a video stabilization mode and a photo stabilization mode. In some embodiments, the video stabilization mode provide for substantially no on-board image stabilization processing to stabilize respective frames of captured video content. In other embodiments, the video stabilization mode provides image stabilization processing of the image data, but to a lesser extent than is the case with image stabilization processing in the photo stabilization mode.

In some embodiments, the camera controller is further configured to: determine whether the activation duration exceeds a predefined threshold interval; and, in response to determining that the activation duration exceeds the threshold interval, to cause disposal of the image stabilization parameter to the less rigorous mode. In some embodiments, the camera controller is configured to cause, in response to determining that the activation duration is less than the threshold interval, disposal of the image stabilization parameter to the more rigorous mode.

The described techniques further represent example embodiments of a method for operating an electronic device consistent with the above-discussed features, and to a computer readable storage medium with instructions for causing a machine to perform such a method.

It is a benefit of the disclosed techniques that they provide for an electronic device with improved image-capturing functionalities compared to existing devices. The quality of images captured by use of the device is, for example, improved due to automated modification of the relevant parameters. This is achieved without requiring additional user input or parameter adjustment. Thus, image stabilization, for example, is automatically tuned to be appropriate for the type of visual media the user intends to capture (e.g., automatically discriminating between video and photo modes), while using a single control button for both video and photo capturing.

A further benefit is that device resource usage is optimized. For example, resource-intensive photo stabilization is employed only when the user wishes to capture digital photographs, but not when video is captured. This is again achieved without requiring separate user selection of the particular mode, and is achieved even though initiation of video capturing and photo capturing using the single-action control button is identical, i.e., by pressing of the control button.

Example Machine and Hardware Components

The example electronic devices described above may incorporate various computer components or machine elements, at least some of which are configured for performing automated operations and/or for automatically providing various functionalities. These include, for example, automated image data processing and image capturing parameter adjustment, as described. The glasses 31 may thus provide an independent computer system. Instead, or in addition, the glasses 31 may form part of a distributed system including on ore more off-board processors and/or devices.

Figure 7:
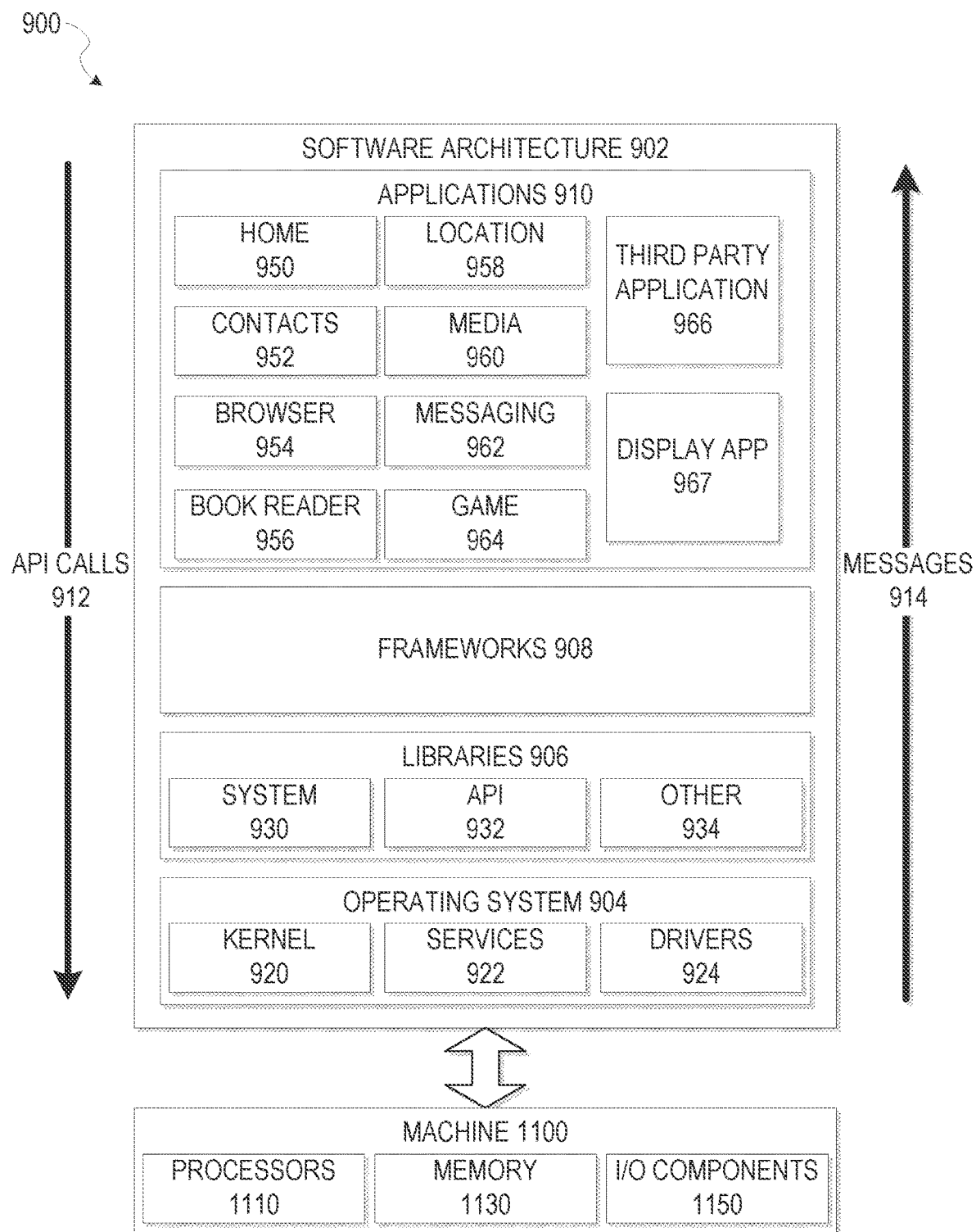
FIG. 7 is a block diagram illustrating an example of a software architecture that may be installed on a machine, according to some example embodiments.

FIG. 7 is a block diagram 900 illustrating an architecture of software 902, which can be installed on any one or more of the devices described above. FIG. 7 is merely a non-limiting example of a software architecture, and it will be appreciated that many other architectures can be implemented to facilitate the functionality described herein. In various embodiments, the software 902 is implemented by hardware such as machine 1100 of FIG. 8 that includes processors 1110, memory 1130, and I/O components 1150. In this example architecture, the software 902 can be conceptualized as a stack of layers where each layer may provide a particular functionality. For example, the software 902 includes layers such as an operating system 904, libraries 906, frameworks 908, and applications 910. Operationally, the applications 910 invoke application programming interface (API) calls 912 through the software stack and receive messages 914 in response to the API calls 912, consistent with some embodiments. In various embodiments, any client device, server computer of a server system, or any other device described herein may operate using elements of software 902. Devices such as the camera controller 214 and other components of the portable electronic devices, as described earlier, may additionally be implemented using aspects of software 902.

In various implementations, the operating system 904 manages hardware resources and provides common services. The operating system 904 includes, for example, a kernel 920, services 922, and drivers 924. The kernel 920 acts as an abstraction layer between the hardware and the other software layers consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth. In certain implementations of a device such as the camera controller 214 of smart glasses 31, low-power circuitry may operate using drivers 924 that only contain BLUETOOTH® Low Energy drivers and basic logic for managing communications and controlling other devices, with other drivers operating with high-speed circuitry.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application 966 can invoke the API calls 912 provided by the operating system 904 to facilitate functionality described herein.

Embodiments described herein may particularly interact with a display application 967. Such an application 967 may interact with I/O components 1150 to establish various wireless connections with the described devices. Display application 967 may, for example, communicate with the camera controller 214 to automatically control display of visual media captured by the glasses 31.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). In certain embodiments, for example, a client device may relay or operate in communication with cloud computing systems, and may store media content such as images or videos generated by devices described herein in a cloud environment.

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Figure 8:
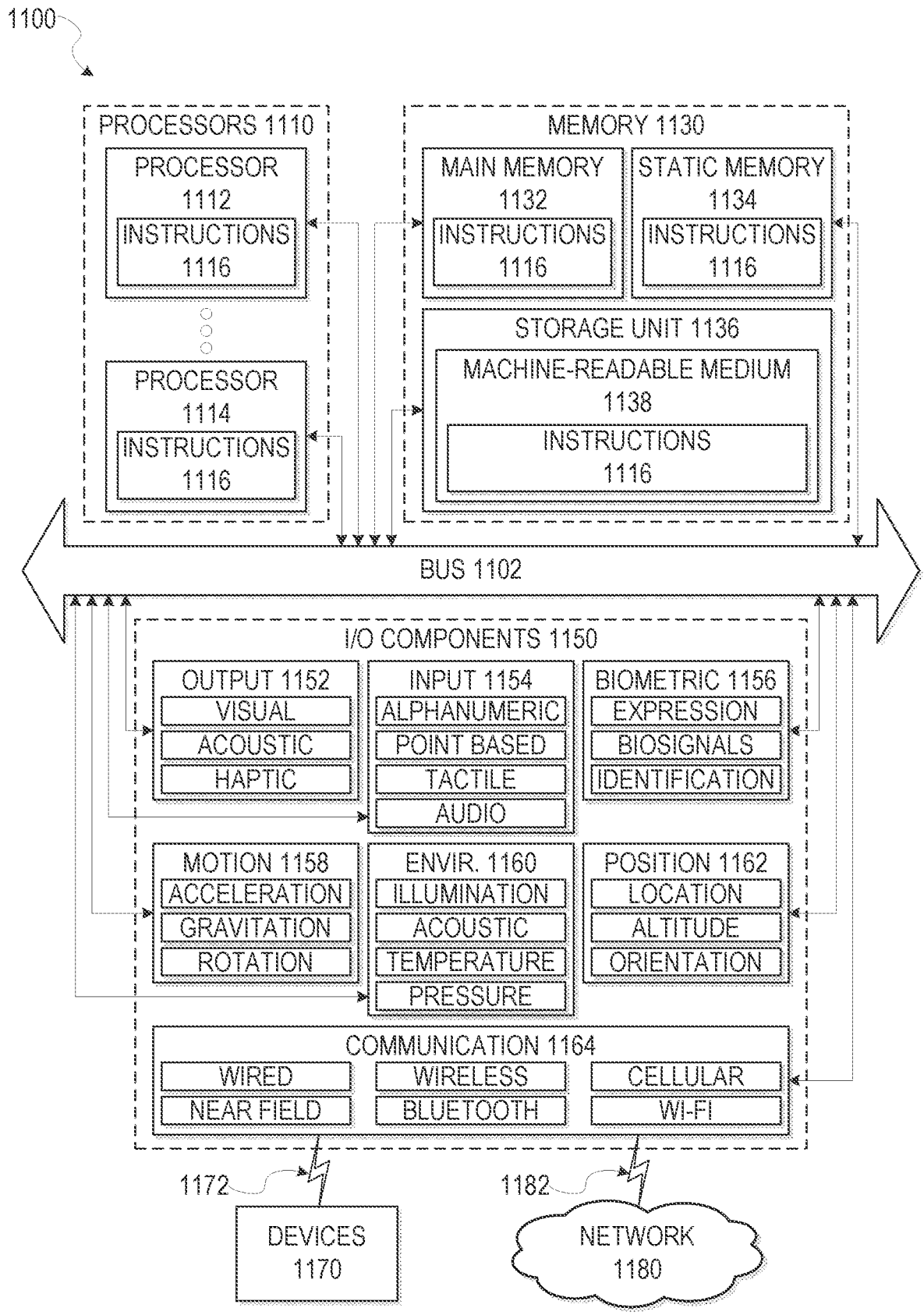
FIG. 8 illustrates a diagrammatic representation of a machine in the form of a computer system within which a set of instructions may be executed for causing the machine to perform any one or more of the methodologies discussed herein, according to an example embodiment.

FIG. 8 is a block diagram illustrating components of a machine 1100, according to some embodiments, able to read instructions from a machine-readable medium (e.g., a machine-readable storage medium) and perform any one or more of the methodologies discussed herein. Specifically, FIG. 8 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein can be executed. In alternative embodiments, the machine 1100 operates as a stand-alone device or can be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

In various embodiments, the machine 1100 comprises processors 1110, memory 1130, and I/O components 1150, which can be configured to communicate with each other via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 1112 and a processor 1114 that may execute the instructions 1116. The term "processor" is intended to include multi-core processors that may comprise two or more independent processors (also referred to as "cores") that can execute instructions contemporaneously. Although FIG. 8 shows multiple processors 1110, the machine 1100 may include a single processor with a single core, a single processor with multiple cores (e.g., a multi-core processor), multiple processors with a single core, multiple processors with multiples cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1138 on which are stored the instructions 1116 embodying any one or more of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are considered machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown in an example embodiment to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 8. The I/O components 1150 are grouped according to functionality merely for simplifying the following discussion, and the grouping is in no way limiting. In various example embodiments, the I/O components 1150 include output components 1152 and input components 1154. The output components 1152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1150 include biometric components 1156, motion components 1158, environmental components 1160, or position components 1162, among a wide array of other components. For example, the biometric components 1156 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 include acceleration sensor components (e.g., accelerometer), gravitation sensor components, rotation sensor components (e.g., gyroscope), and so forth. The environmental components 1160 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1162 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, communication components 1164 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1170 may be another machine or any of a wide variety of peripheral devices (e.g., a peripheral device coupled via a Universal Serial Bus (USB)).

Moreover, in some embodiments, the communication components 1164 detect identifiers or include components operable to detect identifiers. For example, the communication components 1164 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1164, such as location via Internet Protocol (IP) geo-location, location via WI-FI® signal triangulation, location via detecting an BLUETOOTH® or NFC beacon signal that may indicate a particular location, and so forth.

Transmission Medium

In various example embodiments, one or more portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1116 are transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)) Similarly, in other example embodiments, the instructions 1116 are transmitted or received using a transmission medium via the coupling 1172 (e.g., a peer-to-peer coupling) to the devices 1170. The term "transmission medium" shall be taken to include any intangible medium that is capable of storing, encoding, or carrying the instructions 1116 for execution by the machine 1100, and includes digital or analog communications signals or other intangible media to facilitate communication of such software.

Furthermore, the machine-readable medium 1138 is non-transitory (in other words, not having any transitory signals) in that it does not embody a propagating signal. However, labeling the machine-readable medium 1138 "non-transitory" should not be construed to mean that the medium is incapable of movement; the medium 1138 should be considered as being transportable from one physical location to another. Additionally, since the machine-readable medium 1138 is tangible, the medium 1138 may be considered to be a machine-readable device.

What is claimed is:

1. A device comprising:
   a body;
   a camera mounted on the body and configured to capture image data according to a plurality of image-capture parameters;
   an input mechanism configured for receiving user input to control operation of the camera, the input mechanism being disposable by a user between a pressed condition and a released condition; and
   a camera controller incorporated in the body and configured to:
      perform automated processing of pre-input image data captured by the camera before receiving via the input mechanism user input to trigger user-directed image capture;
      based on the processing of the pre-input image data, automatically performing an automated adjustment action to modify at least one of the plurality of image-capture parameters, thus producing modified image-capture parameters;
      thereafter, receiving via the user input mechanism user input to trigger user-directed image capture; and
      responsive to the user input, capturing image data with the camera according to the modified image-capture parameters.

2. The device of claim 1, wherein the pre-input image data comprises video content captured by the camera, the video content comprising a plurality of video frames.

3. The device of claim 2, wherein capturing of the pre-input image data by the camera is automatically triggered by invocation of a video capture mode visual capture mode.

4. The device of claim 3, wherein invocation of the visual capture mode comprises launching on the device of an application that has image-capturing functionality.

5. The device of claim 2, wherein:
   the processing of the pre-input image data comprises processing the video content to calculate an image metric value for the video content; and
   wherein the automated adjustment action modifies the at least one image-capture parameter based on the calculated image metric value.

6. The device of claim 5, wherein the processing of the pre-input image data comprises:
   extracting from the plurality of video frames constituting the video content a subset of video frames; and
   determining a count of video frames in the subset for which a respective image metric value exceeds a predefined threshold value.

7. The device of claim 6, wherein:
   the image metric value is a brightness value of the respective video frame; and
   the at least one modified image-capture parameter is selected from the group comprising: ISO level, shutter speed, and f-stop value.

8. The device of claim 6, wherein performance of the automated adjustment action is conditional upon the count of threshold-exceeding video frames exceeding a predefined count threshold.

9. The device of claim 1, wherein the automated adjustment action comprises automatically causing display of a user interface element on a user interface provided by the device, the camera controller being configured to modify the at least one image-capture parameter responsive to user-selection of the user interface element.

10. The device of claim 1, wherein the automated adjustment action comprises automatically modifying the at least one image-capture parameter.

11. A method comprising:
   at an electronic device having an on-board camera configured to capture image data according to a plurality of image-capture parameters, capturing via the camera pre-input image data;
   processing the pre-input image data to calculate an image metric value for the pre-input image data;
   based on the calculated image metric value, automatically performing an automated adjustment action to modify at least one of the plurality of image-capture parameters, thus producing modified image-capture parameters;
   thereafter, receiving user input to trigger user-directed image-capture, the user input being received via an input mechanism disposable by a user between a pressed condition and a released condition; and
   responsive to the user input, capturing image data with the camera according to the modified image-capture parameters.

12. The method of claim 11, wherein the pre-input image data comprises video content captured by the camera, the video content comprising a plurality of video frames.

13. The method of claim 12, wherein capturing of the pre-input image data by the camera is automatically triggered by invocation of a video capture mode visual capture mode.

14. The method of claim 13, wherein invocation of the visual capture mode comprises launching on the device of an application that has image-capturing functionality.

15. The method of claim 12, wherein:
   the processing of the pre-input image data comprises processing the video content to calculate the image metric value for the video content; and
   wherein the automated adjustment action modifies the at least one image-capture parameter based on the calculated image metric value.

16. The method of claim 15, wherein the processing of the pre-input image data comprises:
   extracting from the plurality of video frames constituting the video content a subset of video frames; and
   determining a count of video frames in the subset for which a respective image metric value exceeds a predefined threshold value.

17. The method of claim 16, wherein:
   the image metric value is a brightness value of the respective video frame; and
   the at least one modified image-capture parameter is selected from the group comprising: ISO level, shutter speed, and f-stop value.

18. The method of claim 11, wherein the automated adjustment action comprises:
   automatically causing display of a user interface element on a user interface provided by the device; and
   modifying the at least one image-capture parameter responsive to user-selection of the user interface element.

19. The method of claim 11, wherein the automated adjustment action comprises automatically modifying the at least one image-capture parameter.

20. A non-transitory computer readable storage medium which has stored thereon instructions that, when executed by a computer, cause the computer to perform operations comprising:

at an electronic device having an on-board camera configured to capture image data according to a plurality of image-capture parameters; capturing via the camera pre-input image data;

processing the pre-input image data to calculate an image metric value for the pre-input image data;

based on the calculated image metric value, automatically performing an automated adjustment action to modify at least one of the plurality of image-capture parameters, thus producing modified image-capture parameters;

thereafter, receiving user input to trigger user-directed image-capture, the user input being received via an input mechanism disposable by a user between a pressed condition and a released condition; and responsive to the user input, capturing image data with the camera according to the modified image-capture parameters.

* * * * *

UNITED STATES PATENT AND TRADEMARK OFFICE
CERTIFICATE OF CORRECTION

PATENT NO. : 10,778,884 B2  Page 1 of 1
APPLICATION NO. : 16/505670
DATED : September 15, 2020
INVENTOR(S) : Yan et al.

It is certified that error appears in the above-identified patent and that said Letters Patent is hereby corrected as shown below:

On the Title Page

Item (72), in "Inventors", in Column 1, Line 1, delete "Ray," and insert --Rey,-- therefor In the Claims In Column 23, Line 3, in Claim 20, delete "parameters;" and insert --parameters,-- therefor Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*